(12) United States Patent
Hudrick et al.

(10) Patent No.: US 6,540,144 B1
(45) Date of Patent: Apr. 1, 2003

(54) TECHNIQUES FOR INTERFACING A BAR CODE SCANNER TO A PC USING A KEYBOARD RETRANSMIT PROTOCOL

(75) Inventors: Donald T. Hudrick, Sicklerville, NJ (US); John A. Furlong, Woodbury, NJ (US); Ian A. Scott, Haddonfield, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 69 days.

(21) Appl. No.: 09/614,356

(22) Filed: Jul. 12, 2000

Related U.S. Application Data

(60) Provisional application No. 60/144,361, filed on Jul. 16, 1999.

(51) Int. Cl.[7] .................................................. G06K 7/10
(52) U.S. Cl. .................................................. 235/462.15
(58) Field of Search ..................................... 235/462.15

(56) References Cited

U.S. PATENT DOCUMENTS

| | | | | |
|---|---|---|---|---|
| 5,021,640 A | * | 6/1991 | Muroi .......................... | 186/61 |
| 5,178,234 A | | 1/1993 | Sakurai et al. | |
| 5,848,292 A | * | 12/1998 | Nathan .......................... | 710/2 |
| 5,854,945 A | * | 12/1998 | Criscito et al. .............. | 235/435 |
| 5,875,415 A | | 2/1999 | Lieb et al. | |
| 6,263,383 B1 | * | 7/2001 | Lee et al. .................... | 709/218 |
| 6,312,175 B1 | * | 11/2001 | Lum .......................... | 400/472 |

FOREIGN PATENT DOCUMENTS

JP         8-328717    * 12/1996

OTHER PUBLICATIONS

Symbol Technologies "ScanPlus Reference Manual" Edition 1.0 Apr., 1996, p. 4–39.*
Copyright 1996 Information Access Company; Automatic I.D. News; Sep., 1996; p. 18; ISSN: 0890–9768.
Copyright 1996 Information Access Company; Packaging Digest; May, 1996; vol. 33; No. 6; p. 34; ISSN: 0030–9117.
MS900 by Metrologic Instruments, Inc.; Sep. 1998; www.metrologic.com.

* cited by examiner

Primary Examiner—Mark Tremblay
(74) Attorney, Agent, or Firm—Morgan, Lewis & Bockius, LLP

(57) ABSTRACT

A bar code scanner is equipped with a keyboard emulation mechanism so as to provide an enhanced interface to a keyboard controller port of a computing device such as a personal or laptop computer. The keyboard emulation mechanism eliminates the necessity of connecting an actual computer keyboard to the port by responding to the computing device's standard power-on diagnostic procedure as if it were effectively an electrical equivalent of a computer keyboard. The keyboard emulation mechanism can also be equipped to detect a keyboard inhibit signal at the keyboard controller port. If the keyboard emulation mechanism detects a keyboard inhibit signal while a data byte is being transmitted to the keyboard controller port, the keyboard emulation mechanism retransmits this data byte to the keyboard controller port. The data byte may specify a scan code corresponding to a keyboard key press or all or part of a decoded bar code. This retransmission process is repeated up to a specified number of times, so as to provide additional opportunities for the scan code to be inputted to the keyboard controller port if the port is momentarily disabled by the keyboard inhibit signal. For many applications, it is advantageous to repeat the retransmission process up to three times for a given data byte. If the data byte is still not successfully received after the third attempt, the process is no longer repeated.

36 Claims, 13 Drawing Sheets

TECHNIQUES FOR INTERFACING A BAR CODE SCANNER TO A PC USING A KEYBOARD RETRANSMIT PROTOCOL

The present patent application is based upon Provisional Application Ser. No. 60/144,361, filed on Jul. 16th, 1999, and entitled, "Techniques for Interfacing a Bar Code Scanner to a PC Using a Keyboard Retransmit Protocol", the disclosure of which is incorporated herein by reference.

FIELD OF THE INVENTION

The invention relates generally to bar code scanners, and more specifically, to techniques for interfacing bar code scanners with computers.

BACKGROUND OF THE INVENTION

For years, various bar code scanner manufacturers have been selling keyboard-wedge bar code scanners. With reference to FIG. 1, bar code scanner 108 is connected to a personal computer (PC) 100 keyboard controller port 104 and a computer keyboard 110 in an Y or wedge type configuration. Bar code scanner 108 may contain an on-board processor 109. PC 100 also contains a processor 101. The Y or wedge type configuration is implemented using interconnection cable 106 such that computer keyboard 110 and bar code scanner 108 are placed in parallel across controller port 104. This parallel configuration is used because keyboard controller 102 circuitry within presently-existing PCs (personal computers) 100 and laptop computers attempts to detect the existence of a computer keyboard 110 connected to the keyboard controller port 104. The controller port 104 needs to be connected to a computer keyboard 110, even if the keyboard is not to be used for subsequent data entry, and even if the controller port 104 is also connected to an input device other than a computer keyboard. If the keyboard controller 102 circuitry does not detect a keyboard connected to the controller port 104, the PC 100 and/or laptop may then disable the port, preventing any further inputting of data. In the operational environment of FIG. 1, this disablement poses a problem, because we desire to input further data as bar codes are detected and decoded.

With the increasing use of laptop computers and keyless data entry, the keyboard controller port shows great potential as a convenient, somewhat standardized, and readily available data input channel. However, this potential could be advantageously exploited only if it were possible to find some way around the necessity of connecting this port to an actual computer keyboard. By way of clarification, there are a number of existing programs that do not require the use of a computer keyboard per se, but these programs have neglected to provide mechanisms by which a computer keyboard is emulated, so as to prevent the controller port from being disabled.

Assume that a conventional keyboard wedge bar code scanner is connected to a keyboard controller port of a PC or laptop, as shown in FIG. 1, while, at the same time, the keyboard that is connected in the parallel (Y) configuration is eliminated. Will the hardware configuration of FIG. 1 still function as desired? It is important to realize that keyboard-to-PC communications is implemented by means of a 2-way channel. Other types of data must be communicated between the PC and the keyboard in addition to information specifying the key or keys that were pressed. When a PC is powered up, the PC is programmed to check for the existence of a primary data input device, which is typically a keyboard. The PC begins a data exchange with the keyboard, and this communication is called "power-on diagnostics". If the keyboard is not present, or if the power-on diagnostics fail, the PC will not boot up. Accordingly, if a normal boot-up is desired, the keyboard shown in FIG. 1 should not be eliminated. In the case of laptop computers, a similar situation exists. A communication protocol is used to sense the presence of an external keyboard that is connected to the laptop's external keyboard port. If the laptop computer fails to detect a keyboard at the external keyboard port, then the laptop computer may disable its external keyboard port.

Even if a technique were to be developed by which a bar code scanner could successfully emulate a computer keyboard, another problem would then arise. Eleven (11)-bit transmission protocols are utilized almost universally to provide keyboard to PC data transfer. The transmission protocol begins with a Start bit (low), followed by 8 data bits, a Parity bit (odd parity) and finally a Stop bit (high). In the context of a computer keyboard, these 8 data bits are used to represent one or more scan codes corresponding to keyboard key presses. However, in the operational environment of FIG. 2, these data bits can be employed to represent all or part of a detected bar code. Irrespective of whether these 8 bits represent actual key presses or bar codes, the aforementioned transmission protocol remains unchanged. The protocol allows the PC (or laptop) to interrupt the transmitted sequence up through the $9^{th}$ bit. Since the $9^{th}$ bit can be used to represent all or part of a scan code, the PC will prevent the communication of a scan code if the PC sends out a keyboard port inhibit any time before the $9^{th}$ bit is received by the port. If the scan code represents all or part of a decoded bar code, upon issuance of a keyboard controller port interrupt, the PC will prevent the successful receipt of this bar code at the keyboard controller port.

The aforementioned keyboard inhibit problem is described in greater detail in a reference book entitled, "PC KEYBOARD DESIGN", by J. Konzak, and published by Annabook. In the configuration of FIG. 1, the inhibit problem could cause decoded bar code data to be lost, ignored, corrupted, or misread once the PC or laptop interrupts communication. With the advent of multitasking operating systems, sophisticated network operating systems, and dual-keyboard port laptops and PC's, the problem worsens. Some of these operating systems interrupt keyboard port communications on a frequent and periodic basis, such as once every ten milliseconds. Of course, in operational environments where the keyboard controller port is not used with an auxiliary input devices, the computer keyboard will sense this stoppage of communications and retransmit the scan code after the PC releases its halt or inhibit of the keyboard. Existing bar code scanners are not so equipped. If a data transmission from a bar code scanner is interrupted, the scanner has no mechanism by which to ascertain whether or not a data entry error has occurred.

Pursuant to prior art techniques, bar code scanners had not monitored the inhibit signal because the decoded bar codes were wedged into the transmitted data for brief periods of time, relative to typed-in keyboard data. Also, as a practical matter, the keyboard BIOS virtually never inhibits the keyboard during scan code transmission. Any problems that may have been encountered were handled by changing certain programmable parameters such as inter-character delays or inter-scan-code delays.

SUMMARY OF THE INVENTION

A bar code scanner is equipped with a keyboard emulation mechanism so as to provide an enhanced interface to a keyboard controller port of a computing device such as a personal or laptop computer. The keyboard emulation mechanism eliminates the necessity of connecting an actual computer keyboard to the port by responding to the computing device's standard power-on diagnostic procedure as if it were effectively an electrical equivalent of a computer keyboard.

Pursuant to a further embodiment of the invention, the keyboard emulation mechanism is equipped to detect a keyboard inhibit signal at the keyboard controller port. This inhibit signal may be generated by the computing device. If the keyboard emulation mechanism detects a keyboard inhibit signal while a data byte is being transmitted to the keyboard controller port, the keyboard emulation mechanism stops transmitting the data byte, waits for the inhibit signal to cease, and then retransmits the data byte to the keyboard controller port. This retransmission process is repeated up to a specified number of times, so as to provide additional opportunities for the data byte to be inputted to the keyboard controller port if the port is momentarily disabled by the keyboard inhibit signal. For many applications, it is advantageous to repeat the retransmission process up to three times for a given data byte. If the data byte is still not successfully received after the third attempt, the process is no longer repeated.

Pursuant to a still further embodiment of the invention, the keyboard emulation mechanism keeps track of status indications transmitted by the computing device and related to the status of one or more indicators on a computer keyboard. These indicators may be provided in the form of one or more LED lamps indicative of the status of the Caps-lock, Num-lock, and Scroll-lock keys. The keyboard emulation mechanism also keeps track of the transmission protocol currently in use, such as make-Break,Make-Only, AT or PS2-type scan-code transmission protocols. These status indications and transmission protocols may vary, depending upon the keyboard country type selected, and are maintained by the keyboard emulation mechanism so that the bar code scanner will transmit accurately to the computing device.

The keyboard emulation mechanism may be provided in the form of enhanced software, firmware, and/or programming instructions. This software, firmware, and/or operating instructions can be configured for use with presently-existing keyboard wedge scanners, as well as any of various scanners which may be developed in the future. One purpose of the software, firmware, and/or operating instructions is to accurately transmit a bar code on a transmission line that is subjected to possible halt or inhibit signals issued by the computing device It should be noted that any number of sources contained within the computing device could generate these inhibit signals. When a data byte is received at the keyboard port, this byte, which may represent all or part of a decoded bar code, is optionally displayed on a monitor coupled to the computing device.

DETAILED DESCRIPTION OF THE PREFERRED EMBODIMENTS

Figure 2:
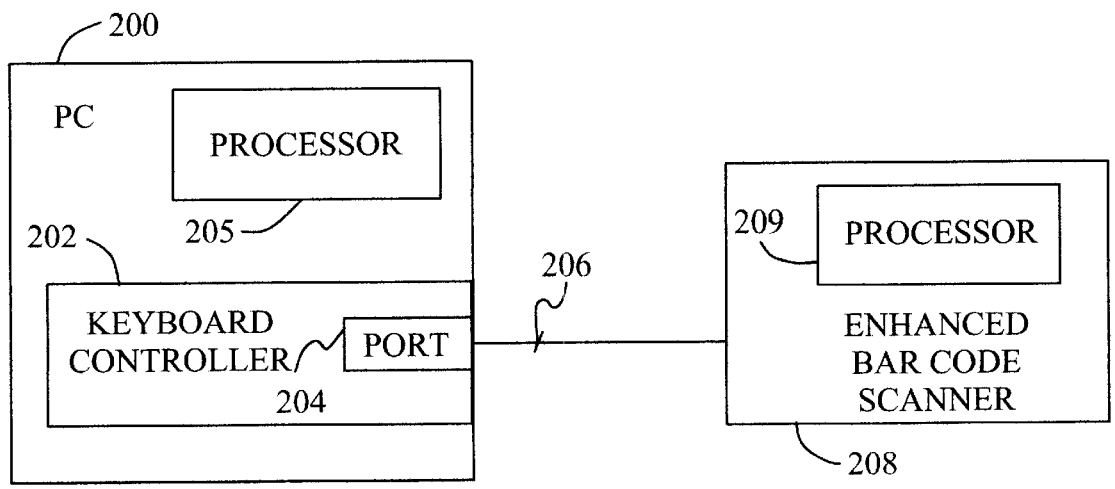
FIG. 2 is a hardware block diagram showing a bar code scanner to personal computer interface using the techniques of the present invention.
Figure 3A:
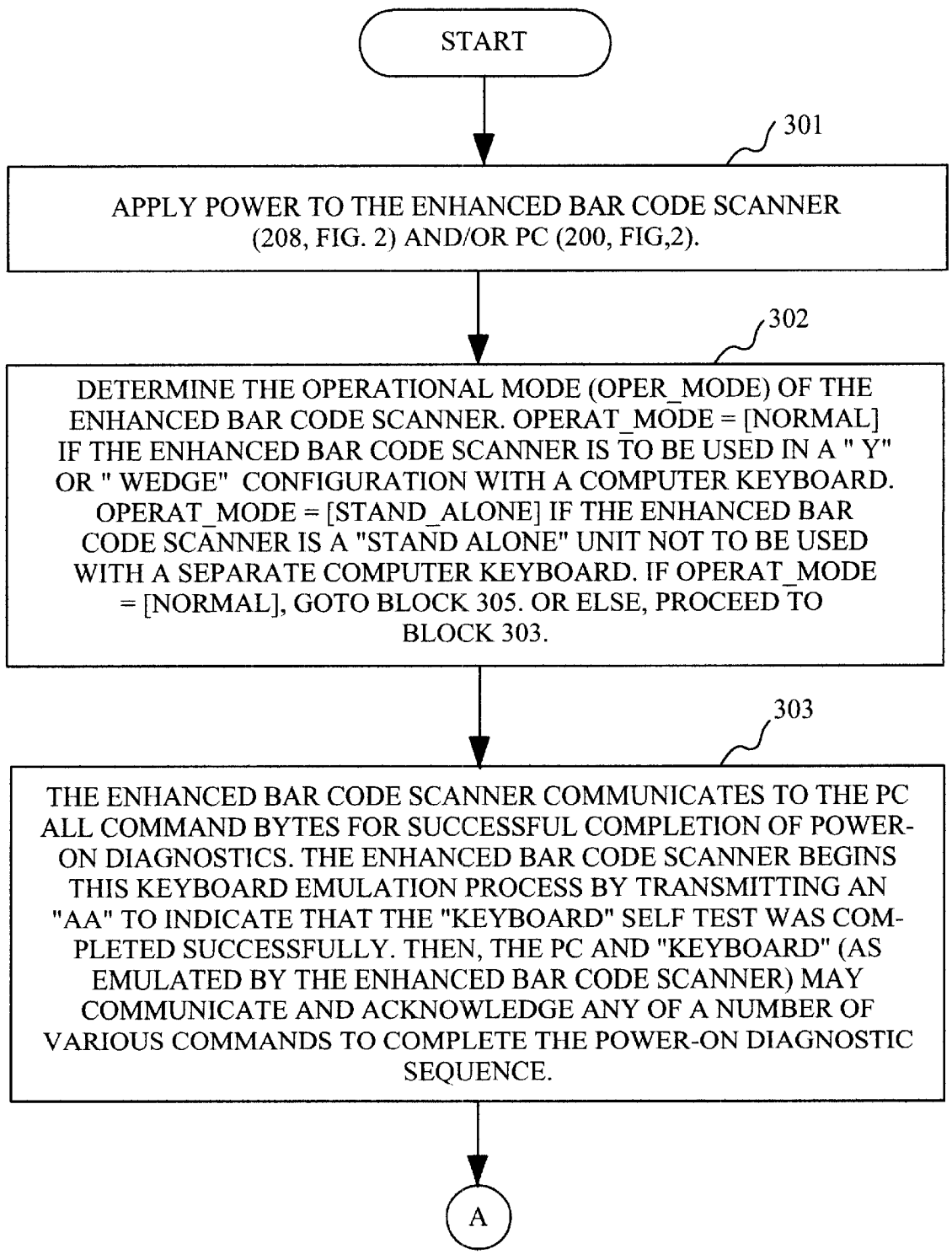
FIGS. 3A–3K together comprise a flowchart setting forth keyboard emulation techniques according to a preferred embodiment of the invention.
Figure 3B:
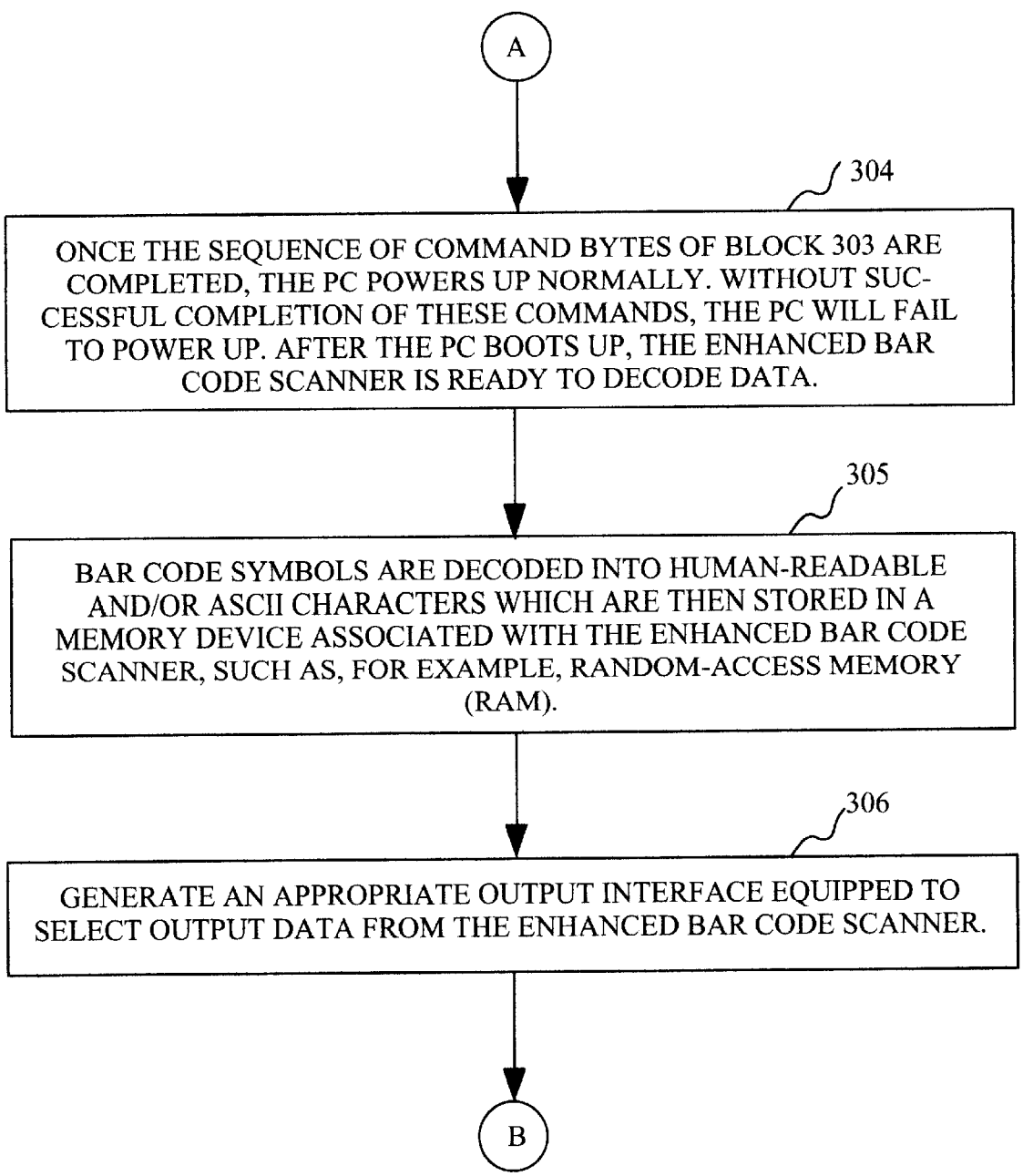
Figure 3C:
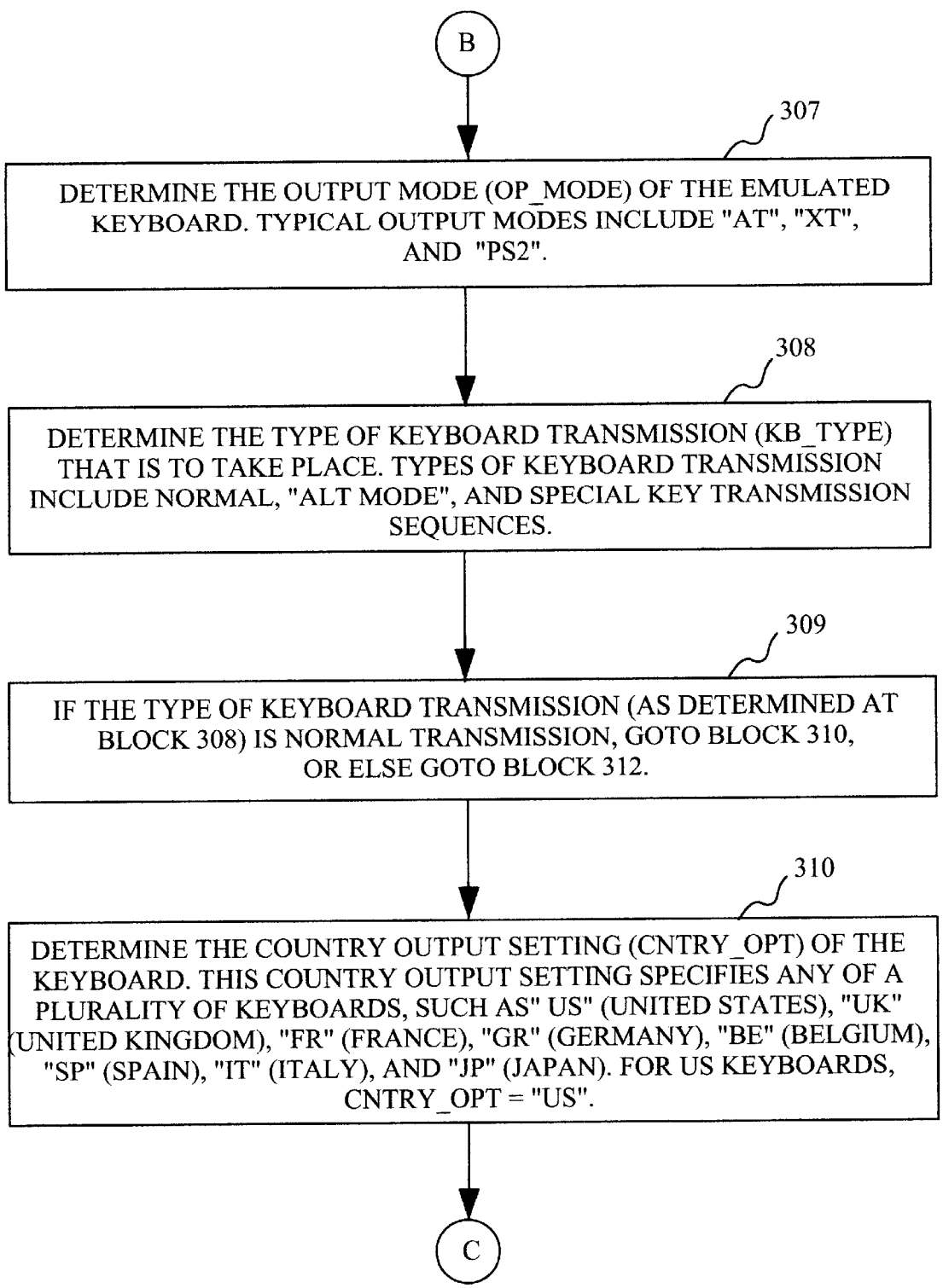
Figure 3D:
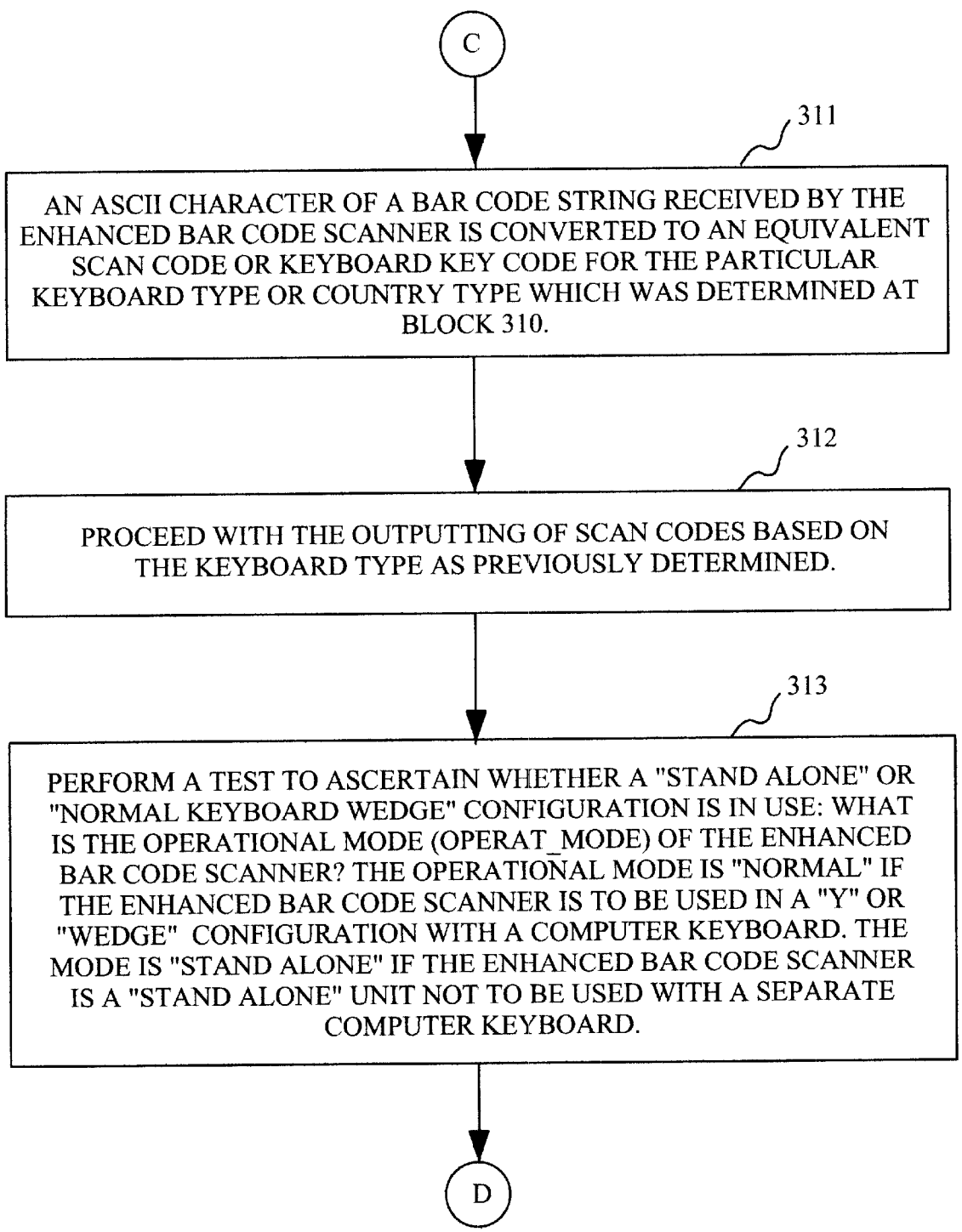
Figure 3E:
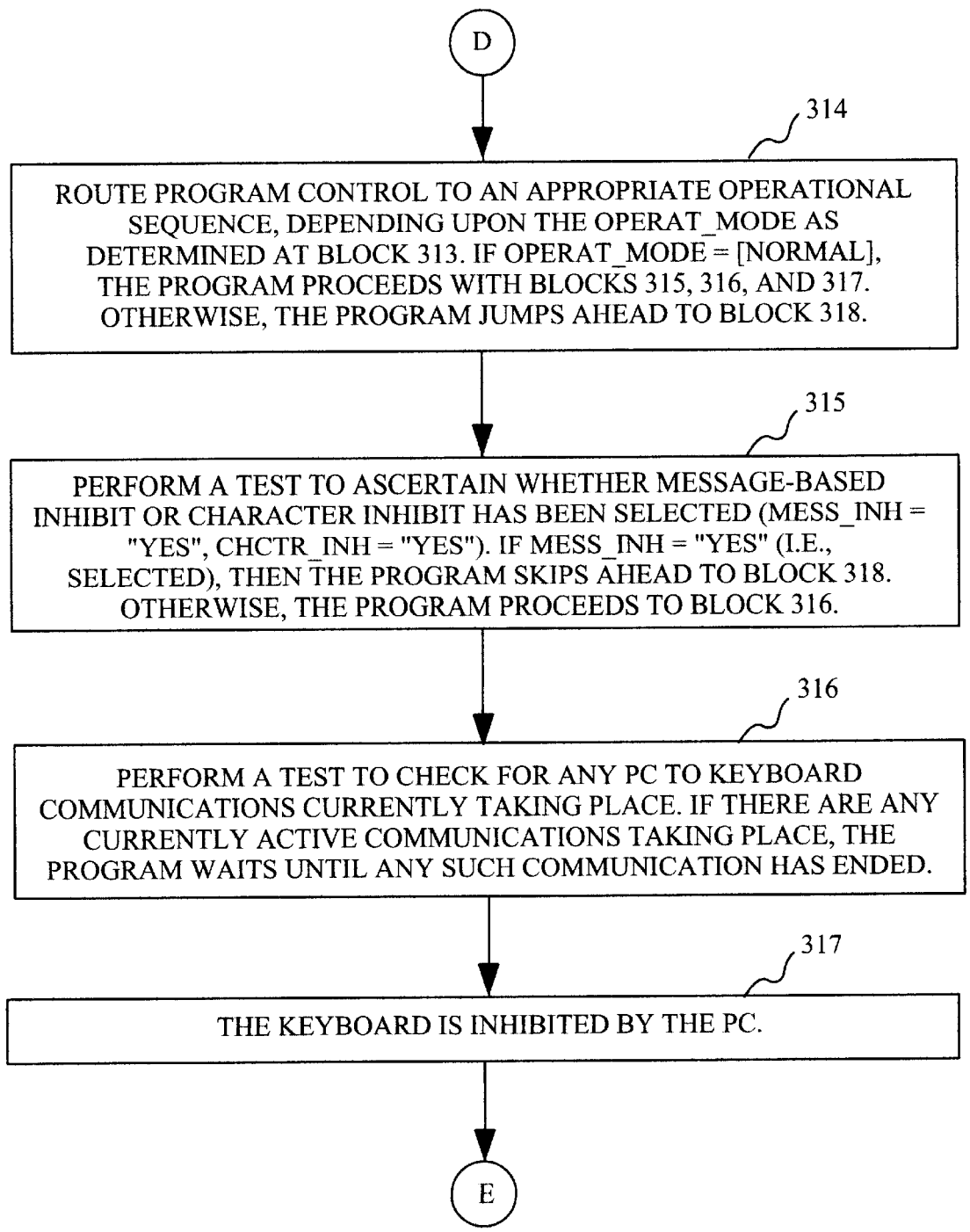
Figure 3F:
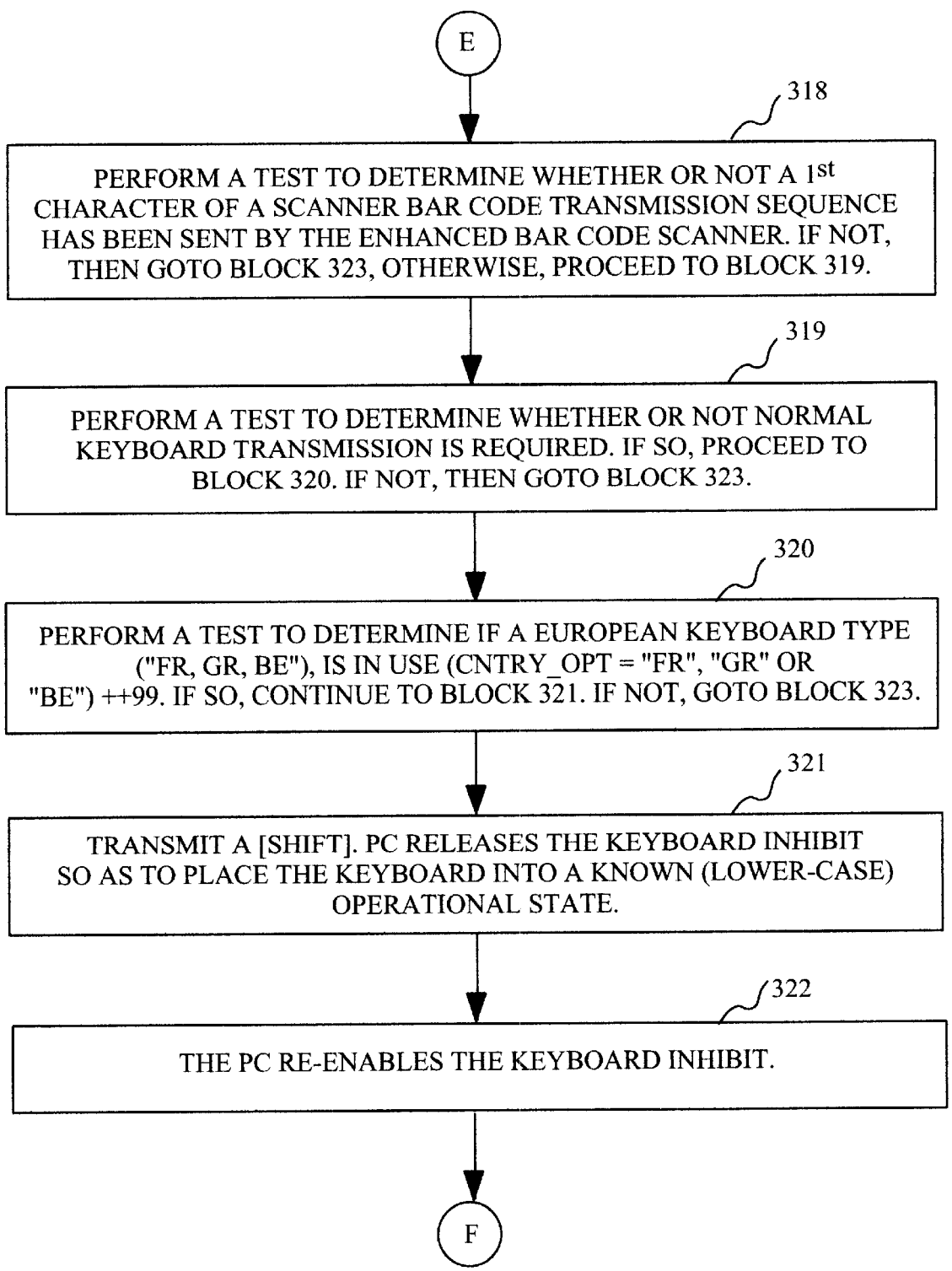
Figure 3G:
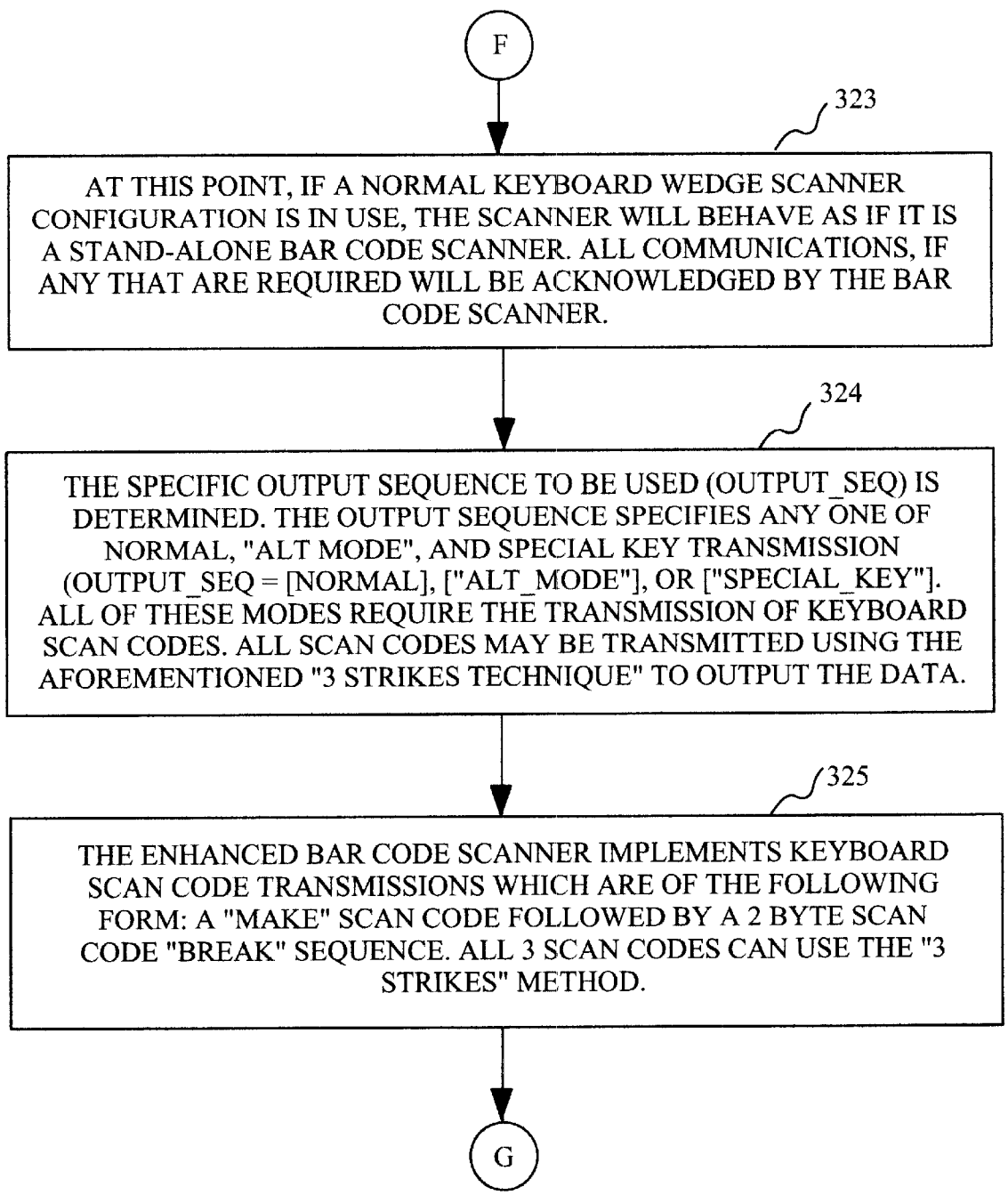
Figure 3H:
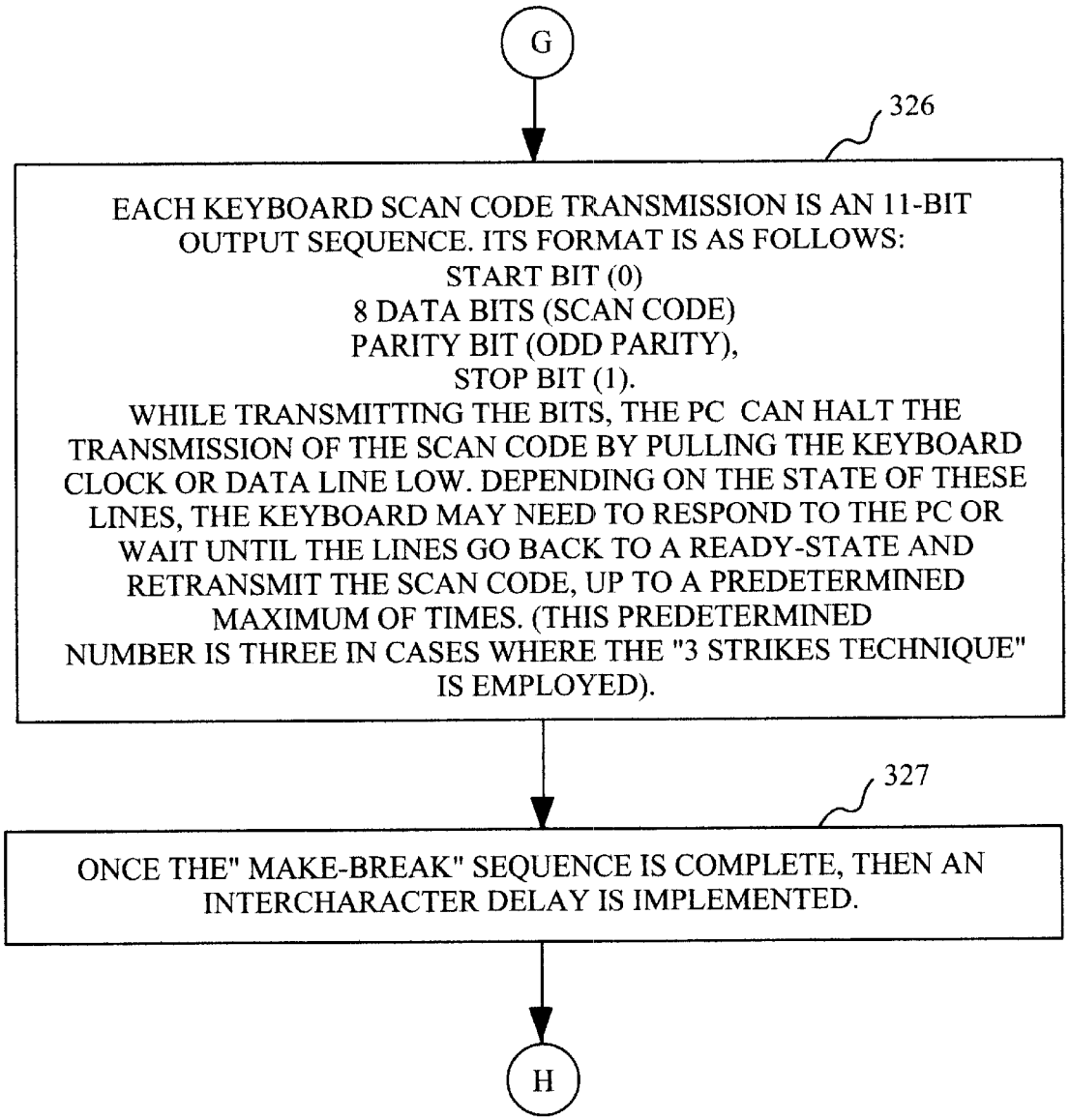
Figure 3I:
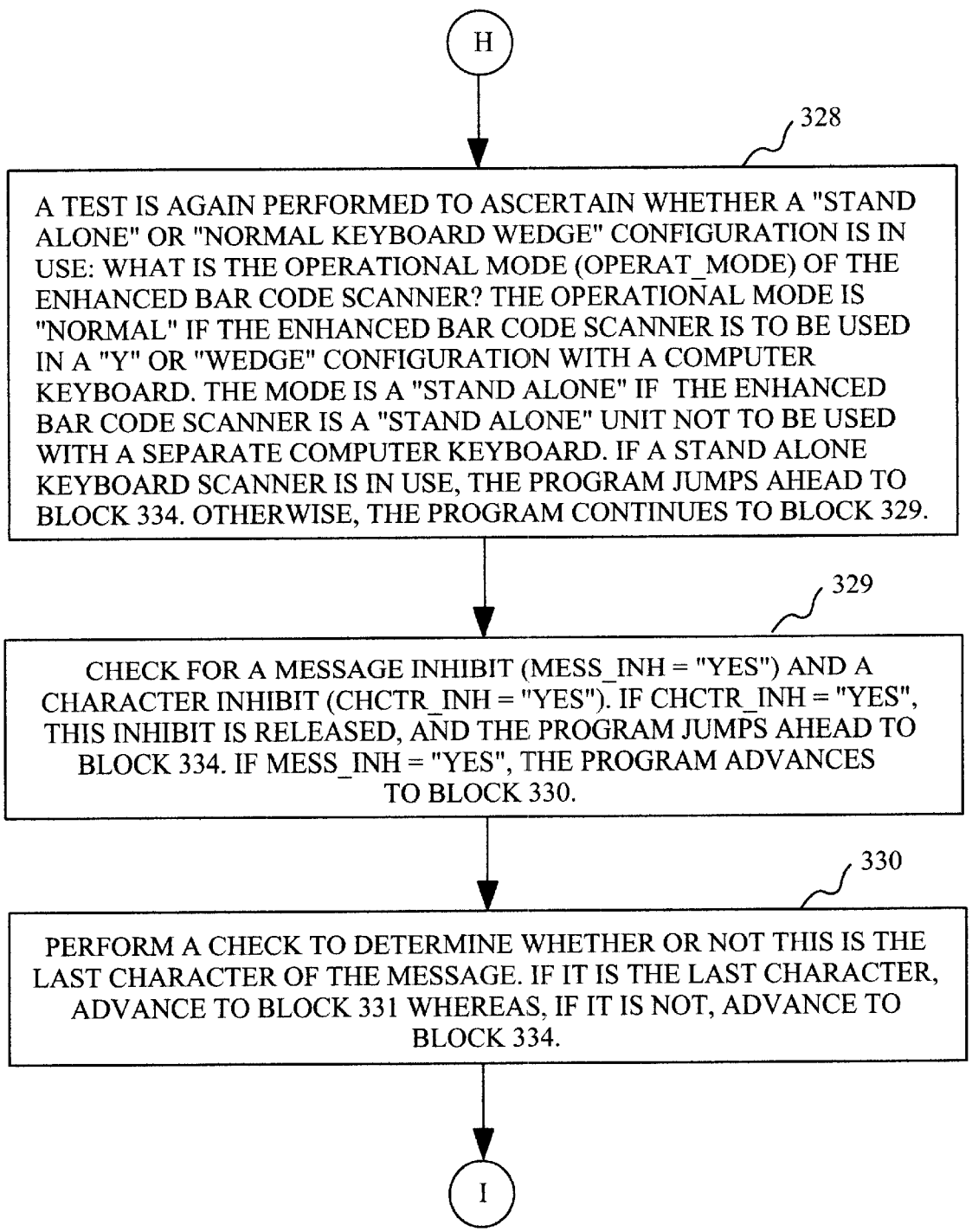
Figure 3J:
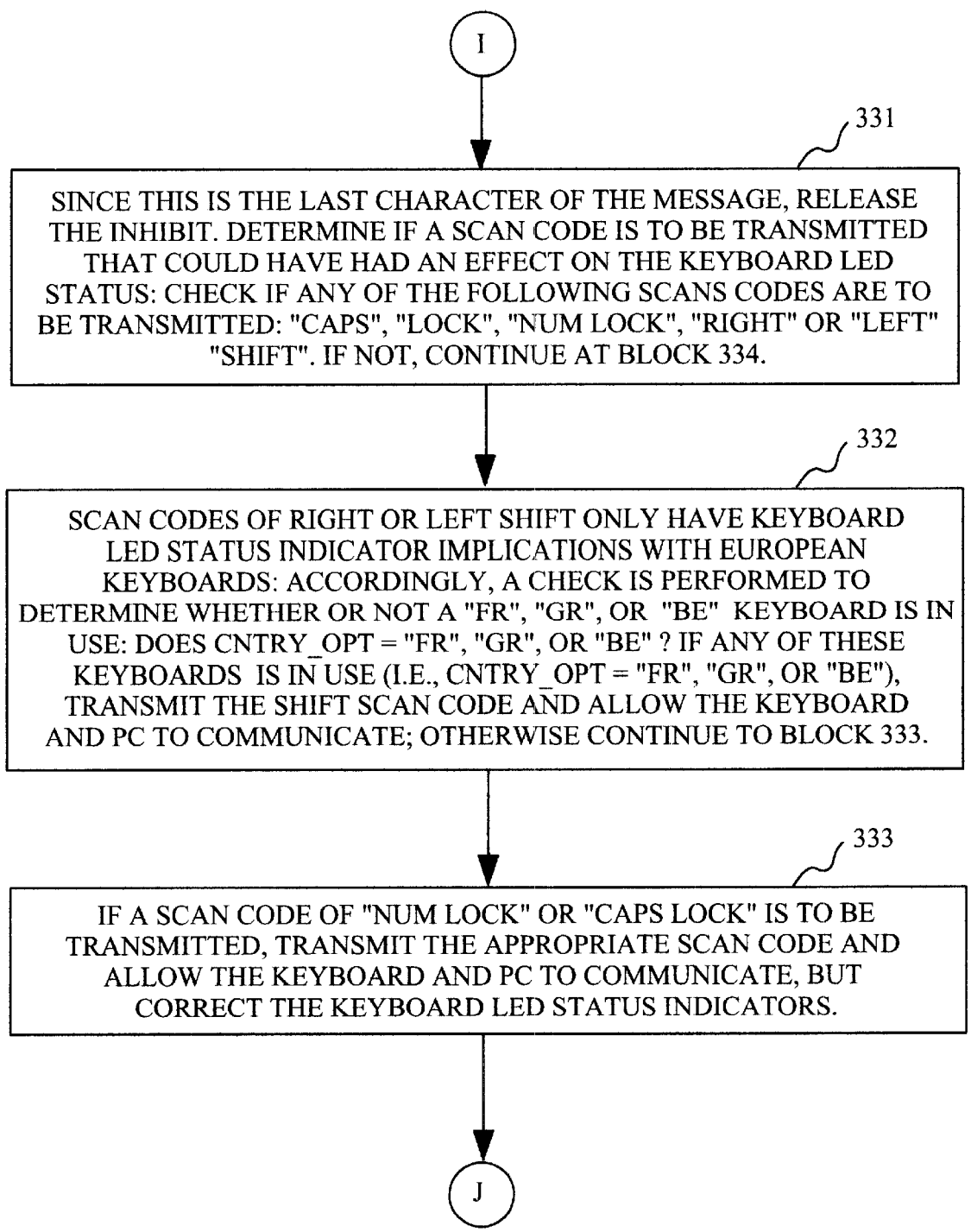
Figure 3K:
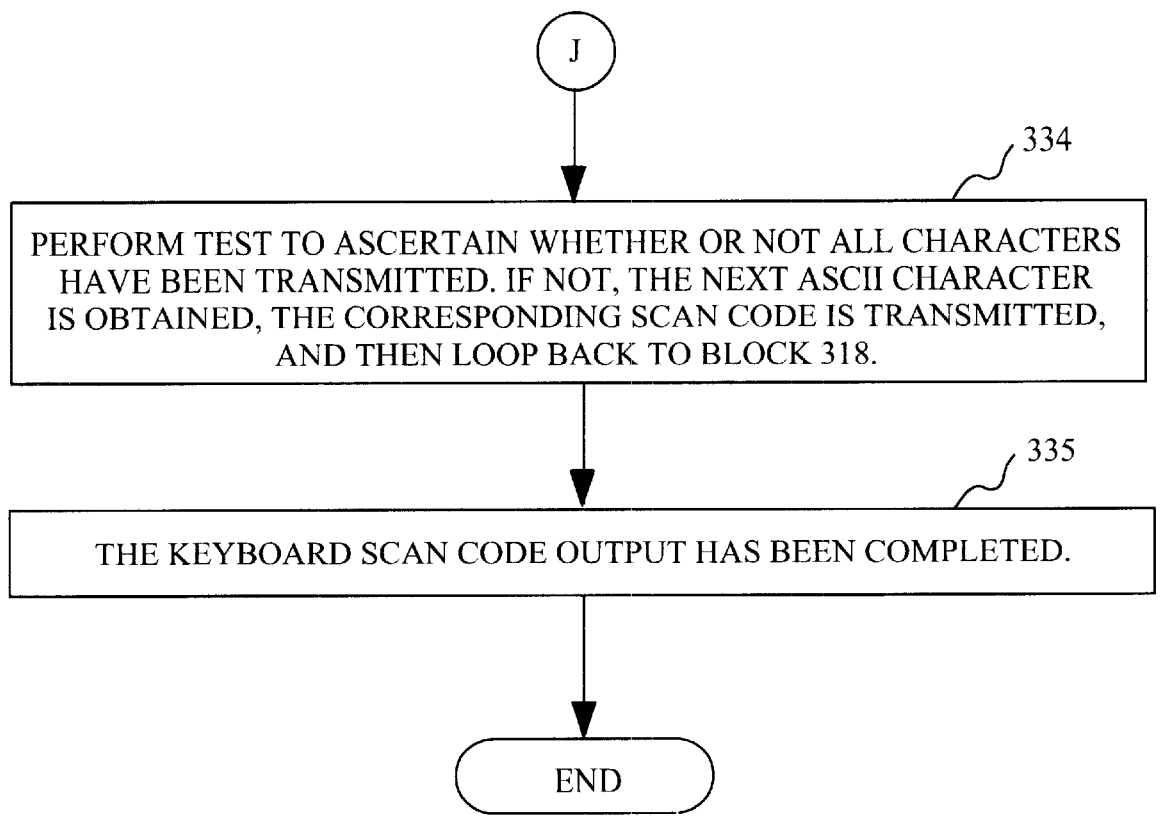

FIG. 2 is a hardware block diagram showing a bar code scanner to personal computer interface using the techniques of the present invention. Enhanced bar code scanner 208 is connected to a keyboard controller port 204 of a personal computer 200 via interconnection cable 206. Keyboard controller port 204 is driven by keyboard controller 202. Interconnection cable 206 is shown for illustrative purposes only, as any other technique for conveying information from one place to another may be used in lieu of, or in addition to, interconnection cable 206. These techniques may include wireless communication, wired communication, optical communication, and others. Moreover, PC 200 is shown for illustrative purposes, as any of a variety of computing devices may be employed in lieu of, or in addition to, PC 200. In the example of FIG. 2, PC 200 includes a processor 205. Enhanced bar code scanner 208 may contain an on-board processor 209.

Figure 1:
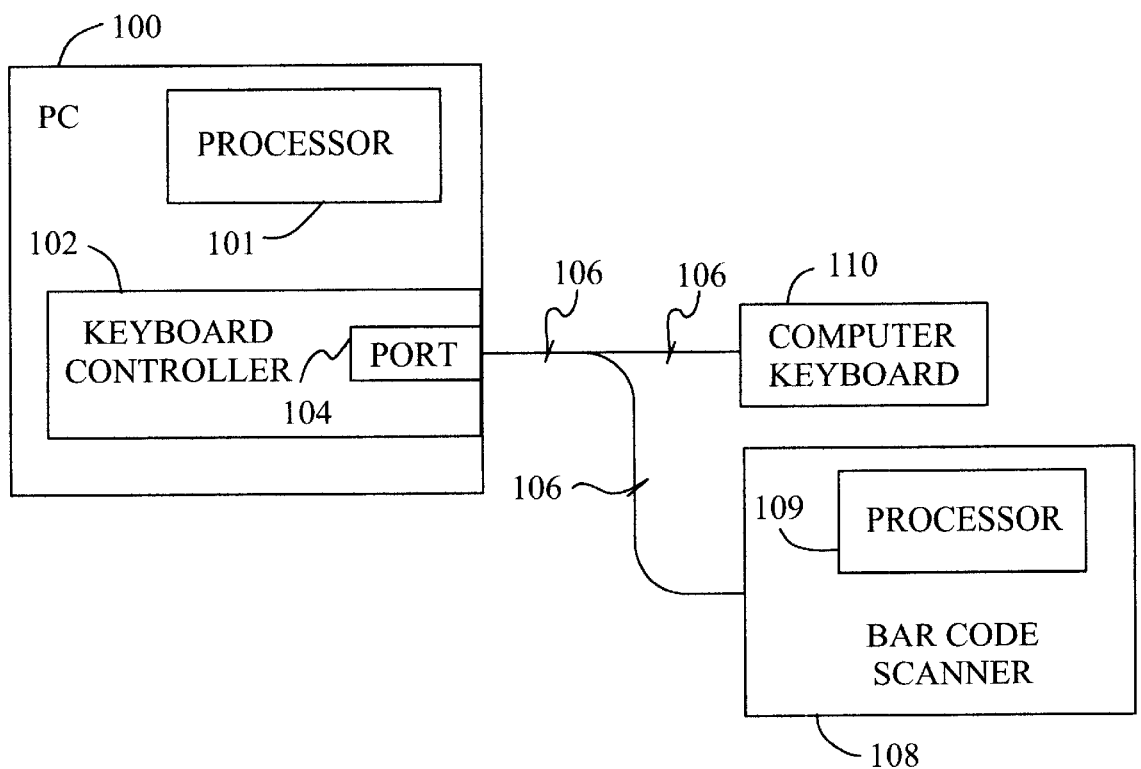
FIG. 1 is a hardware block diagram showing a bar code scanner to personal computer interface using prior art techniques.

In the configuration of FIG. 2, a computer keyboard 110 need not be employed to perform the keyboard emulation techniques discussed herein. Accordingly, a wedge or Y connection between enhanced bar code scanner 208, keyboard controller port 204, and a computer keyboard is not required. However, if one wished to provide an additional input source to PC 200, an optional computer keyboard could be provided. This optional keyboard could be connected, for example, using the Y or wedge type configuration shown in FIG. 1.

Enhanced bar code scanner 208 is "enhanced" in the sense that it is equipped with a keyboard emulation mechanism. This mechanism provides an interface to a keyboard port of a computing device such as a personal or laptop computer. As stated above, the keyboard emulation mechanism may include software, firmware, and/or operating instructions. Use of the term "keyboard emulation mechanism" is not necessarily indicative of any hardware enhancements to the bar code scanner. The keyboard emulation mechanism eliminates the necessity of connecting an actual computer keyboard to the port by responding to the computing device's standard power-on diagnostic procedure as if it were effectively an electrical equivalent of a computer keyboard.

Pursuant to a further embodiment of the invention, the keyboard emulation mechanism of enhanced bar code scanner 208 is equipped to detect a keyboard inhibit signal at the keyboard controller port 204. This inhibit signal may be generated by PC 200), and/or by any of a number of devices coupled to, and/or within this computing device. For example, the inhibit signal may be generated by the PC pulling the clock line to a logic "low" state. In this example, the keyboard emulation mechanism would detect the existence of a keyboard inhibit signal by monitoring the clock line.

If the keyboard emulation mechanism detects a keyboard inhibit signal while a data byte is being transmitted to the keyboard controller port 204, the keyboard emulation mechanism retransmits this data byte to the keyboard controller port 204. This retransmission process is repeated up to a specified number of times, so as to provide additional opportunities for the data byte to be inputted to the keyboard controller port 204 if the port is momentarily disabled by the keyboard inhibit signal. For many applications, it is advantageous to repeat the retransmission process up to three times for a given data byte. If the data byte is still not successfully received after the third attempt, the process is no longer repeated. This data byte may represent one or more scan codes which, in turn, represent one or more keyboard key presses or decoded bar codes.

Pursuant to a still further embodiment of the invention, the keyboard emulation mechanism keeps track of status indications transmitted by the computing device (in the example of FIG. 2, PC 200) and related to the status of one or more indicators on a computer keyboard. These indicators may be provided in the form of one or more LED lamps indicative of the status of the Caps-lock, Num-lock, and Scroll-lock keys. The keyboard emulation mechanism also keeps track of the transmission protocol currently in use, such as make-Break,Make-Only, AT or PS2-type scan-code transmission protocols. These status indications and transmission protocols may vary, depending upon the keyboard country type selected, and are maintained by the keyboard emulation mechanism so that the enhanced bar code scanner 208 will transmit accurately to PC 200.

The keyboard emulation mechanism may be provided in the form of enhanced software, firmware, and/or programming instructions. This software, firmware, and/or operating instructions can be configured for use with presently-existing keyboard wedge scanners, as well as any of various scanners which may be developed in the future. One purpose of the software, firmware, and/or operating instructions is to accurately transmit a bar code on a transmission line that is subjected to possible halt or inhibit signals issued by the computing device. It should be noted that any number of sources contained within the computing device could generate these inhibit signals. When a data byte is received at the keyboard port, this byte, which may represent all or part of a decoded bar code, is optionally displayed on a monitor coupled to the computing device.

Refer to FIGS. 3A–3K which together comprise a flowchart setting forth a keyboard emulation method according to a preferred embodiment of the invention. In overview, the method is organized into a first sequence of steps related to power-up and diagnostics (blocks 301–304), a second sequence of steps related to the decoding and storing of data (blocks 305–306), a third sequence of steps related to keyboard output (blocks 307–308), a fourth sequence of steps related to ASCII to scan code conversion (blocks 309–311), a fifth sequence of steps related to preparation for a keyboard output sequence (blocks 312–317), a sixth sequence of steps related to first character keyboard initialization (blocks 318–322), a seventh sequence of steps related to keyboard scan code output (blocks 323–327), an eighth sequence of steps related to preparation for exiting the keyboard scan code transmission program (blocks 328–333), and a ninth sequence of steps related to a determination of whether or not there are more characters to transmit (blocks 334–335). It should be noted that the above-described organization of the steps into nine sequences is set forth for purposes of illustration and convenience. The steps may, but need not, be organized in the manner described above.

First Sequence of Steps
Power-Up and Power on Diagnostics

The program of FIGS. 3A–3K commences at block 301, where power is applied to enhanced bar code scanner (208, FIG. 2) and/or PC (200, FIG. 2) Next, at block 302 (FIG. 3), the program determines the operational mode of the enhanced bar code scanner. The operational mode is "normal" if the enhanced bar code scanner is to be used in a Y or wedge configuration with a computer keyboard, similar to the configuration of FIG. 1. The mode is "stand-alone" if, as shown in FIG. 2, the enhanced bar code scanner is a "stand alone" unit not to be used with a separate computer keyboard. If the operational mode is "normal", the program skips ahead to block 305. Otherwise, the program proceeds to block 303.

At block 303, it has already been determined that a separate computer keyboard (refer to FIG. 1) is not present. Accordingly, the enhanced bar code scanner (FIG. 2) must communicate to PC 200 all command bytes for successful completion of power-on diagnostics. The enhanced bar code scanner begins this keyboard emulation process by transmitting an "AA" to indicate that the "keyboard" self-test was completed successfully. After this point, the PC and "keyboard" (as emulated by the enhanced bar code scanner) may communicate and acknowledge any of a number of various commands to complete the power-on diagnostic sequence. Some PC's require more information than others for the power-on diagnostic procedure. Therefore the number of commands sent by the PC and acknowledged by the emulated keyboard is variable. These commands may include any of the following: Typamatic Rate, Make/Break status, scan code set enabled, and LED status.

At block 304, once the sequence of command bytes of block 303 are completed, the PC will power up normally. Note that powering up is sometimes referred to as "booting up". Without successful completion of these commands, the PC will fail to power up. After the PC boots up, the enhanced bar code scanner is ready to decode data.

Second Sequence of Steps
Decoding and Storing Data

At block 305, bar code symbols are decoded into human-readable and/or ASCII characters which are then stored in a memory device associated with the enhanced bar code scanner, such as, for example, random-access memory (RAM). At block 306, the program generates an appropriate output interface equipped to select output data from the enhanced bar code scanner.

Third Sequence of Steps
Begin Keyboard Output

A test is performed at block 307 to determine the output mode of the emulated keyboard. Typical output modes include AT, XT, and PS2. At block 308, the program determines the type of keyboard transmission that is to take place. Types of keyboard transmission include normal, ALT Mode, and special key transmission sequences.

Fourth Sequence of Steps
ASCII to Scan Code Conversion

At block 309, if the type of keyboard transmission (as determined at block 308) is normal transmission, the program proceeds to blocks 310 & 311. Otherwise, the program jumps ahead to block 312. The country output setting of the keyboard is determined at block 310. This country output setting specifies any of a plurality of keyboards, such as US (United States), UK (United Kingdom), FR (France), GR (Germany), BE (Belgium), SP (Spain), IT (Italy), and JP (Japan). Next, at block 311, an ASCII character of a bar code string received by the enhanced bar code scanner is converted to an equivalent scan code or keyboard key code for the particular keyboard type or country type determined at block 310.

Fifth Sequence of Steps
Prepare for Keyboard Output Sequence

The program proceeds (block 312) with the outputting of scan codes based on the keyboard type as previously determined at block 310. Then, at block 313, a test is performed to ascertain whether a "stand alone" (FIG. 2) or "normal keyboard wedge" configuration is in use. The "normal keyboard wedge" configuration is similar to FIG. 1, except that an enhanced bar code scanner is used in place of bar code scanner 108. At block 314, program control is routed to an appropriate operational sequence, depending upon the configuration in use as determined at block 313. If a "normal keyboard wedge" configuration is in use, the program proceeds with blocks 315, 316, and 317. Otherwise, the program jumps ahead to block 318.

At block 315, a test is performed to ascertain whether message-based inhibit or character inhibit has been selected. If message inhibit has been selected, then the program skips ahead to block 318. Otherwise, the program proceeds to block 316. A test is performed at block 316 to check for any PC to keyboard communications currently taking place. If there are any currently active communications taking place, the program waits until any such communication has ended. Then (block 317), the keyboard is inhibited from the PC.

Sixth Sequence of Steps
First Character Keyboard Initialization

This sequence commences by performing a test to determine whether or not a $1^{st}$ character of a scanner bar code transmission sequence has been sent by the enhanced bar code scanner (block 318). This scanner bar code transmission sequence is organized into a data byte, as previously described. If not, the program jumps ahead to block 323. Otherwise, the program proceeds to block 319, where a check is performed to determine whether or not normal keyboard transmission is required. If so, the program proceeds to block 320. If not, the program jumps ahead to block 323.

Next, a test is performed to determine if a European keyboard type (FR, GR, BE).is in use. If so, the program continues to block 321. If not, the program jumps ahead to block 323. At block 321, a [SHIFT] is transmitted and the PC releases the keyboard inhibit so as to place the keyboard into a known (lower-case) operational state. The PC then re-enables the keyboard inhibit (block 322).

Seventh Sequence of Steps
Keyboard Scan Code (S) Are Outputted

At this point (block 323), if a normal keyboard wedge scanner configuration is in use, the scanner will communicate with other system components as if it was a standalone bar code scanner. All communications, if any, that are required will be acknowledged by the bar code scanner. Next (block 324), the output sequence is determined. The output sequence specifies any of Normal, Alt Mode, and Special Key transmission. All of these modes require the transmission of keyboard scan codes. Alt mode transmits the decimal value of the ASCII value using the numeric keypad scan codes. Special Key transmissions are the transmission of non-ASCII keys (i.e. function keys—F1, F2, etc., arrow keys and so forth). Normal key transmission is the transmission of normal ASCII characters that have an associated keyboard scan code. All scan codes may be transmitted using the aforementioned "3 strikes technique" to output the data.

The enhanced bar code scanner implements a keyboard scan code transmission (block 325) using a plurality of data bytes. A "MAKE" scan code followed by a 2 byte scan code BREAK sequence is transmitted. All 3 scan codes can use the "3 strikes" method. At block 326, each keyboard scan code transmission is an 11-bit output sequence. Its format is as follows: Start bit (0), 8 data bits (scan code), parity bit (odd parity) and a stop bit (1). While transmitting the bits, the PC can halt the transmission of the scan code by pulling the keyboard clock or data line low. Depending on the state of these lines, the keyboard may need to respond to the PC or wait until the lines go back to a ready-state and retransmit th e scan c ode , up to a predetermined maximum number of times. This predetermined number is three in cases where the "3 strikes technique" is employed. Once the MAKE-BREAK sequence is complete (block 327), then an inter-character delay is implemented.

Eighth Sequence of Steps
Prepare to Exit Keyboard Scan Code Transmission Routine A test is again performed to ascertain whether a "stand alone" (FIG. 2) or "normal keyboard wedge" configuration is in use (block 328). If a Stand alone keyboard scanner is in ue, the program jumps ahead to block 334. Otherwise, the program continues to block 329, where the program checks for a Message Inhibit and a Character Inhibit. If a Character Inhibit exists, this inhibit is released, and the program jumps ahead to block 334. If a Message Inhibit exists, the program advances to block 330, where a check is performed to determine whether or not this is the last character of the message. If it is the last character , the program advances to block 331 whereas, if it is not., the program advances to block 334.

At block 331, since this is the last character of the message, it is time to release the inhibit. It must also be determined if a scan code is to be transmitted that could have had an effect on the keyboard LED status. Check if any of the following scans codes are to be transmitted: Caps: Lock, Num Lock, Right or Left Shift. If not, continue at Block 334. Next (block 332), scan codes of Right or Left Shift only have keyboard LED status indicator implications with European keyboards. Accordingly, a check is performed to determine whether or not a FR, GR, or BE keyboard is in use. If any of these keyboards is in use, transmit the Shift scan code and allow the keyboard and PC to communicate; otherwise continue to block 333. If a scan code of Num Lock or Caps Lock is to be transmitted, transmit the appropriate scan code and allow the KB and PC to communicate, but correct the keyboard LED status indicators.

Ninth Sequence of Steps
Determine Last Character to be Transmitted

Check if all characters have been transmitted (block 334). If not, the next ASCII character is obtained, the corresponding scan code is transmitted, and the program loops back to block 318. At block 335, the keyboard scan code output has been completed.

The program of FIGS. 3A–3K has been organized into nine operational sequences for illustrative purposes and as an explanatory aid. Those skilled in the art can appreciate that the program need not necessarily be organized into nine operational sequences, as variations thereto are still within the spirit and scope of the invention.

As stated above, the keyboard emulation mechanism may include software, firmware, and/or operating instructions. Use of this term herein is not necessarily indicative of any hardware enhancements to the bar code scanner. If the scanner is programmed to allow for up to three retransmissions, such a method is referred to as the "3-strikes-technique". A conventional transmission of one pressed key consists of three (3) characters—a make scan code and two (2) break code characters. Therefore, this technique could possibly transmit up to 9 characters to complete the key sequence. This retransmit technique gives the enhanced bar code scanner a limited number of retries per scan code, thus allowing a transmission sequence to move forward instead of hanging or sticking while trying to retransmit the same character over and over again.

But why should there ever be a need to retransmit a scan code? The retransmit protocol was developed after noticing that other devices or software within the PC could also inhibit the keyboard controller port. Some devices/software such as network drivers may inhibit the keyboard controller port every few milliseconds to perform some function without interrupt. Other devices, such as a mouse, may be on the same interrupt as the keyboard controller port, thus requiring the keyboard controller port to be inhibited while the software governing the mouse moves the mouse cursor. With laptops, the same types of inhibit issues can exist. However, even more restraints may be placed on the external keyboard controller port of a laptop than would be the case with a conventional PC. This renders use of the keyboard controller port as an auxiliary input channel all the more difficult in the operational environment of laptop computing.

With the advent of Windows 3.1 and Window 95, it appeared that more and more devices/software were effecting the behavior of the keyboard controller port. Therefore, it was imperative that a technique was developed that would transmit the scan code accurately, but take into account the fact that during transmission the keyboard could receive an inhibit and a retransmit would be necessary to accurately transmit the decoded bar code. The "3-strikes-technique" set forth herein accomplishes this task uniquely within a limited transmission sequence.

We claim:

1. A bar code scanner adapted for connection to: (i) a keyboard controller port of a computing device, and (ii) a computer keyboard, in a keyboard-wedge configuration, the bar code scanner having a keyboard inhibit mechanism for preventing an intermingling of bar code data acquired by the bar code scanner and typed-in keyboard data and typed into the keyboard; the keyboard inhibit mechanism comprising:
    (a) a monitoring mechanism adapted to test for the existence of any communication in progress between the keyboard and the computing device;
    (b) a switching mechanism, coupled to the monitoring mechanism, wherein, in response to an absence of communication in progress between the keyboard and the computing device, the switching enters a first state so as to disable subsequent communications between the computer keyboard and the keyboard controller port, thereby inhibiting the keyboard;
    (c) a bar code transmission mechanism, responsive to the switching mechanism being in the first state, for transmitting a decoded bar code to the keyboard controller port as a sequence of data bytes, for emulating any communications that may be required between the keyboard controller port and the keyboard; and, upon an initial power-on of the computing device, providing an interface to a keyboard controller port of the computing device, so as to eliminate the necessity of connecting an actual computer keyboard to the keyboard controller port by responding to a power-on diagnostic procedure implemented by the computing device as if the bar code transmission mechanism were effectively an electrical equivalent of a computer keyboard; and wherein the switching mechanism is responsive to the bar code transmission mechanism such that, once the bar code transmission mechanism has transmitted all characters of the bar code to the keyboard controller port, the switching mechanism enters a second state so as to release the keyboard inhibit and to permit communications between the keyboard and the keyboard controller port.

2. The bar code scanner of claim 1 wherein the computing device is a personal computer (PC).

3. The bar code scanner of claim 1 wherein the computing device is a laptop computer.

4. The bar code scanner of claim 1 wherein the keyboard emulation mechanism is equipped to detect a keyboard inhibit signal at the keyboard controller port.

5. The bar code scanner of claim 4 wherein the keyboard inhibit signal is generated by the computing device.

6. The bar code scanner of claim 1 wherein, if the keyboard emulation mechanism detects a keyboard inhibit signal while a data byte including one or more scan codes is being transmitted to the keyboard controller port, the keyboard emulation mechanism retransmits the data byte to the keyboard controller port.

7. The bar code scanner of claim 6 wherein the keyboard emulation mechanism waits until the keyboard inhibit signal ceases and then retransmits the data byte to the keyboard controller port.

8. The bar code scanner of claim 6 wherein the retransmission of the data byte is repeated up to a specified number of times, so as to provide additional opportunities for the data byte to be inputted to the keyboard controller port if the port is momentarily disabled by the keyboard inhibit signal.

9. The bar code scanner of claim 8 wherein the retransmission of the data byte is repeated for up to three times for a given data byte and, if the data byte is still not successfully received after the third attempt, the retransmission is no longer repeated.

10. The bar code scanner of claim 6 wherein the data byte represents a scan code indicative of all or a portion of a decoded bar code.

11. The bar code scanner of claim 1 wherein the keyboard emulation mechanism further includes a tracking mechanism for keeping track of status indications transmitted by the computing device and related to the status of one or more visual indicators on a computer keyboard.

12. The bar code scanner of claim 11 wherein the visual indicators are provided in the form of one or more LED lamps indicative of the status of at least one of a Caps-lock key, a Num-lock key, and a Scroll-lock key.

13. The bar code scanner of claim 1 wherein the keyboard emulation mechanism further includes a protocol tracking mechanism for keeping track of a scan code transmission protocol currently in use.

14. The bar code scanner of claim 13 wherein the scan code transmission protocol includes any of Make-Break, Make-Only, AT and PS2 scan-code transmission protocols.

15. The bar code scanner of claim 1 wherein the keyboard emulation mechanism is provided in the form of at least one of software, firmware, and/or programming instructions.

16. The bar code scanner of claim 15 wherein the software, firmware, and/or operating instructions is configured for use with presently-existing keyboard wedge bar code scanners.

17. The bar code scanner of claim 15 wherein the software, firmware, and/or operating instructions are adapted to transmit a scan code to a keyboard controller port that is subjected to possible keyboard inhibit signals issued by the computing device, such that the scan code is received at the keyboard controller port subsequent to issuance of the keyboard inhibit signal.

18. The bar code scanner of claim 17 wherein the scan code is received at the keyboard controller port and then displayed on a monitor coupled to the computing device.

19. A method for use with a bar code scanner that is adapted for connection to: (i) a keyboard controller port of a computing device, and (ii) a computer keyboard, in a keyboard-wedge configuration, the method preventing an intermingling of bar code data acquired by the bar code scanner and typed-in keyboard data typed into the keyboard, the method performing the steps of:

(a) coupling the bar code scanner to the keyboard controller port of the computing device, (b) the bar code scanner responding to a power-on diagnostic procedure implemented by the computing device as if the bar code scanner were effectively an electrical equivalent of a computer keyboard;

(c) the bar code scanner testing for the existence of any communication in progress between the keyboard and the computing device;

(d) if no such communication is in progress, the bar code scanner causing a switching mechanism to enter a first state so as to disable communications between the keyboard and the computer controller port, thereby inhibiting the keyboard;

(e) the bar code scanner transmitting a decoded bar code to the keyboard controller port as a sequence of data bytes, and/or emulating any communications that may be required between the keyboard controller port and the keyboard; and (f) once the bar code scanner has transmitted all characters of the bar code to the keyboard controller port, the bar code scanner releasing the keyboard inhibit by causing the switching mechanism to enter a second state, so as to permit communications between the keyboard and the keyboard controller port.

20. The method of claim 19 wherein the computing device is a personal computer (PC).

21. The method of claim 19 wherein the computing device is a laptop computer.

22. The method of claim 19 further including the step of the bar code scanner detecting a keyboard inhibit signal at the keyboard controller port.

23. The method of claim 22 wherein the keyboard inhibit signal is generated by the computing device.

24. The method of claim 22 further including the steps of:

(a) the bar code scanner detecting a keyboard inhibit signal while a data byte specifying a scan code is being transmitted to the keyboard controller port, and (b) the bar code scanner retransmitting this data byte to the keyboard controller port.

25. The method of claim 24 further including the steps of:

(a) the keyboard emulation mechanism waiting until the keyboard inhibit signal ceases, and then (b) retransmitting the data byte to the keyboard controller port.

26. The method of claim 24 wherein step (b) is repeated up to a specified number of times, so as to provide additional opportunities for the scan code to be inputted to the keyboard controller port if the port is momentarily disabled by the keyboard inhibit signal.

27. The method of claim 26 wherein the retransmission of the data byte is repeated for up to three times for a given data byte and, if the data byte is still not successfully received after the third attempt, the retransmission is no longer repeated.

28. The method of claim 24 wherein the scan code represents a decoded bar code.

29. The method of claim 19 further including the step of the bar code scanner keeping track of status indications transmitted by the computing device and related to the status of one or more visual indicators on a computer keyboard.

30. The method of claim 29 wherein the visual indicators are provided in the form of one or more LED lamps indicative of the status of at least one of a Caps-lock key, a Num-lock key, and a Scroll-lock key.

31. The method of claim 19 further including the step of the bar code scanner keeping track of a scan code transmission protocol currently in use.

32. The method of claim 30 wherein the scan code transmission protocol includes any of Make-Break, Make-Only, AT and PS2 scan-code transmission protocols.

33. The method of claim 19 implemented by of at least one of software, firmware, and/or programming instructions.

34. The method of claim 23 wherein the software, firmware, and/or operating instructions is configured for use with presently-existing keyboard wedge scanners.

35. The method of claim 33 wherein the software, firmware, and/or operating instructions are adapted to transmit a scan code to a keyboard controller port that is subjected to possible keyboard inhibit signals issued by the computing device, such that the scan code is received at the keyboard controller port subsequent to issuance of the keyboard inhibit signal.

36. The method of claim 35 wherein the scan code is received at the keyboard controller port and then displayed on a monitor coupled to the computing device.

* * * * *